US005427152A

United States Patent [19]

Weber

[11] Patent Number: 5,427,152

[45] Date of Patent: Jun. 27, 1995

[54] HYDRAULIC ACCUMULATOR WITH DIVIDING WALL SUPPORTED BY CONNECTING AND RETAINING PARTS

[75] Inventor: Norbert Weber, Sulzbach, Germany

[73] Assignee: Hydac Technology GmbH, Sulzbach, Germany

[21] Appl. No.: 334,101

[22] Filed: Nov. 4, 1994

Related U.S. Application Data

[63] Continuation of Ser. No. 78,321, Jun. 22, 1993, abandoned.

[30] Foreign Application Priority Data

Sep. 21, 1991 [DE] Germany ........................ 41 31 524.3

[51] Int. Cl.$^{6}$ .............................................. F16L 55/04

[52] U.S. Cl. .......................................... 138/30; 138/26

[58] Field of Search .................. 138/26, 30; 280/85 B; 412/540

[56] References Cited

U.S. PATENT DOCUMENTS

| | | | |
|---|---|---|---|
| 3,137,317 | 6/1964 | Peters | 138/30 |
| 3,674,054 | 7/1972 | Mercier | 138/30 |
| 3,948,287 | 4/1976 | Suzimura et al. | 138/30 |
| 4,117,866 | 10/1978 | Böhms et al. | 138/30 |
| 4,192,350 | 3/1980 | Mercier | 138/30 |
| 4,299,254 | 11/1981 | Zahid | 138/30 |
| 4,429,718 | 2/1984 | Mercier | 138/30 |
| 4,595,037 | 6/1986 | LeBreton et al. | 138/30 |

FOREIGN PATENT DOCUMENTS 3404897 8/1985 Germany .

*Primary Examiner*—James E. Bryant, III

*Attorney, Agent, or Firm*—Roylance, Abrams, Berdo & Goodman

[57] ABSTRACT

A hydraulic accumulator has a dividing wall located in a housing and separating the housing into a liquid chamber and a gas chamber. The dividing wall is held by a retaining part connected to a connecting part. The retaining part at least partly surrounds the connecting part for producing the connection.

23 Claims, 1 Drawing Sheet

HYDRAULIC ACCUMULATOR WITH DIVIDING WALL SUPPORTED BY CONNECTING AND RETAINING PARTS

This is a continuation of application Ser. No. 08/078,321 file Jun. 22, 1993 now abandoned.

FIELD OF THE INVENTION

The present invention relates to a hydraulic accumulator with a dividing wall located in a housing. The dividing wall in the housing separates a liquid chamber from a gas chamber, and is held by means of a retaining part. The retaining part is connected to an annular connecting part welded to the housing.

BACKGROUND OF THE INVENTION

A hydraulic accumulator of this type is known from DE-OS 34 04 897. In this known hydraulic accumulator, the retaining part and the connecting part are constructed in the form of rings. The retaining part holding the dividing wall is inserted with a press fit within a conically formed wall of the housing. The housing abuts the connecting part on its side facing the gas chamber. The connecting part is securely connected to the housing by means of an electron beam welding process. The press fit jointly caused by the conicity of the housing wall is necessary to avoid movement of the retaining part relative to the dividing wall towards the liquid chamber. The gas chamber comprises a corresponding quantity of gas under pressure. Towards the gas side, the retaining part is held in its position by means of the connecting part located in abutment therewith.

Despite this type of fixing of the retaining part within the housing, the latter is able to move along the conical wall in the direction of the liquid chamber. The dividing wall can in this case be released, leaving the hydraulic accumulator unusable. Furthermore, the pressing of the retaining part into the housing is difficult to carry out and is expensive on account of the apparatus necessary for the pressing-in.

SUMMARY OF THE INVENTION

Objects of the present invention involve providing a hydraulic accumulator which can be produced economically and which can reliably ensure that the dividing wall is held securely by the retaining part in any operating state of the hydraulic accumulator.

The foregoing objects are basically obtained by a hydraulic accumulator, comprising a housing having a liquid chamber and a gas chamber, and a dividing wall in the housing separating the liquid chamber from the gas chamber. An annular connecting part is welded to the housing. A retaining part is coupled to the connecting part and holds the dividing wall in the housing. The retaining part at least partly surrounds the connecting part.

In the hydraulic accumulator according to the present invention, the retaining part at least partly surrounds the connecting part to provide the connection therebetween. In any operating state of the hydraulic accumulator, the retaining part is held securely in its position by the connecting part and cannot move either towards the gas chamber or towards the liquid chamber. The dividing wall also maintains its position within the retaining part and does not separate from the retaining part. The housing wall may also have a cylindrical construction at the point of the retaining part. The dividing wall can be inserted loosely in the housing. The cylindrical construction and loose insertion contribute to reduction of the manufacturing costs for a hydraulic accumulator.

In the hydraulic accumulator according to the present invention, the retaining part and the connecting part are preferably constructed in the form of rings.

In a preferred embodiment of the hydraulic accumulator according to the present invention, the retaining part is formed from synthetic material and the connecting part is formed from steel. The synthetic material retaining part can press parts of the dividing wall in a gas-tight-manner against the housing.

Retaining parts in the form of clamping rings, which are made from steel, are complicated and expensive to manufacture and are not always capable of adapting to the housing parts of the housing which are frequently not machined to be exactly round. This leads to leakages. Using a retaining part of synthetic material avoids these problems.

DE-OS 34 04 897 discloses a synthetic material clamping ring of a glass fiber reinforced Polyamide 66 (polyhexamethylene adipinamide) with a glass fiber proportion of 45 to 55%. This known synthetic material clamping ring is suitable for low and high operating temperatures of the hydraulic accumulator, in the range of approximately $-40°$ C. to $+120°$ C. However, since the thermal coefficient of linear expansion between the steel material and the Polyamide 66 amounts to approximately 1:2, leakages and a failure of the hydraulic accumulator, upon departing from that temperature range, can occur.

Therefore, according to the present invention, a polyarylamide with a glass fiber proportion up to 60% is preferably used. This synthetic material has approximately the same thermal coefficient of linear expansion as steel. Thus, the solution according to the present invention can be used for any hydraulic accumulator, irrespective of the temperature range of operation, without experiencing a very different expansion or contraction of the synthetic material retaining part with respect to the housing. Different expansion and contraction would impair the function of the hydraulic accumulator. The glass fiber reinforced polyarylamide, which can be used, has an increased E-modulus value of up to $23000 N/mm^2$. Thus, the synthetic retaining part can be produced by an injection molding method and has high rigidity and dimensional stability.

In a further preferred embodiment, the annular retaining part comprises indentations and a groove for engagement with the connecting part, and has a channel for receiving the bead-shaped edge of the dividing wall. This construction permits the retaining part to be snapped easily onto the connecting part. Also, the dividing wall is held reliably by the retaining part.

On its side remote from the dividing wall and on its side facing the housing, the retaining part preferably comprises a bevel. The bevel serves as an assembly aid.

The housing can comprise an abutment for the dividing wall. In this manner, the housing assists in the reliable fixing of position of the dividing wall in the retaining part.

In a further particularly preferred embodiment of the hydraulic accumulator according to the present invention, the connecting part inside the housing covers the seam between two shells substantially forming the housing. The shells can be connected to each other along the seam by a welding process, particularly an electron beam welding process. During the welding process, the connection part can be connected simultaneously to the housing. Due to this assembly, the hydraulic accumulator can be produced economically. Also, the connecting part and the retaining part with the dividing wall are held reliably in their positions.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
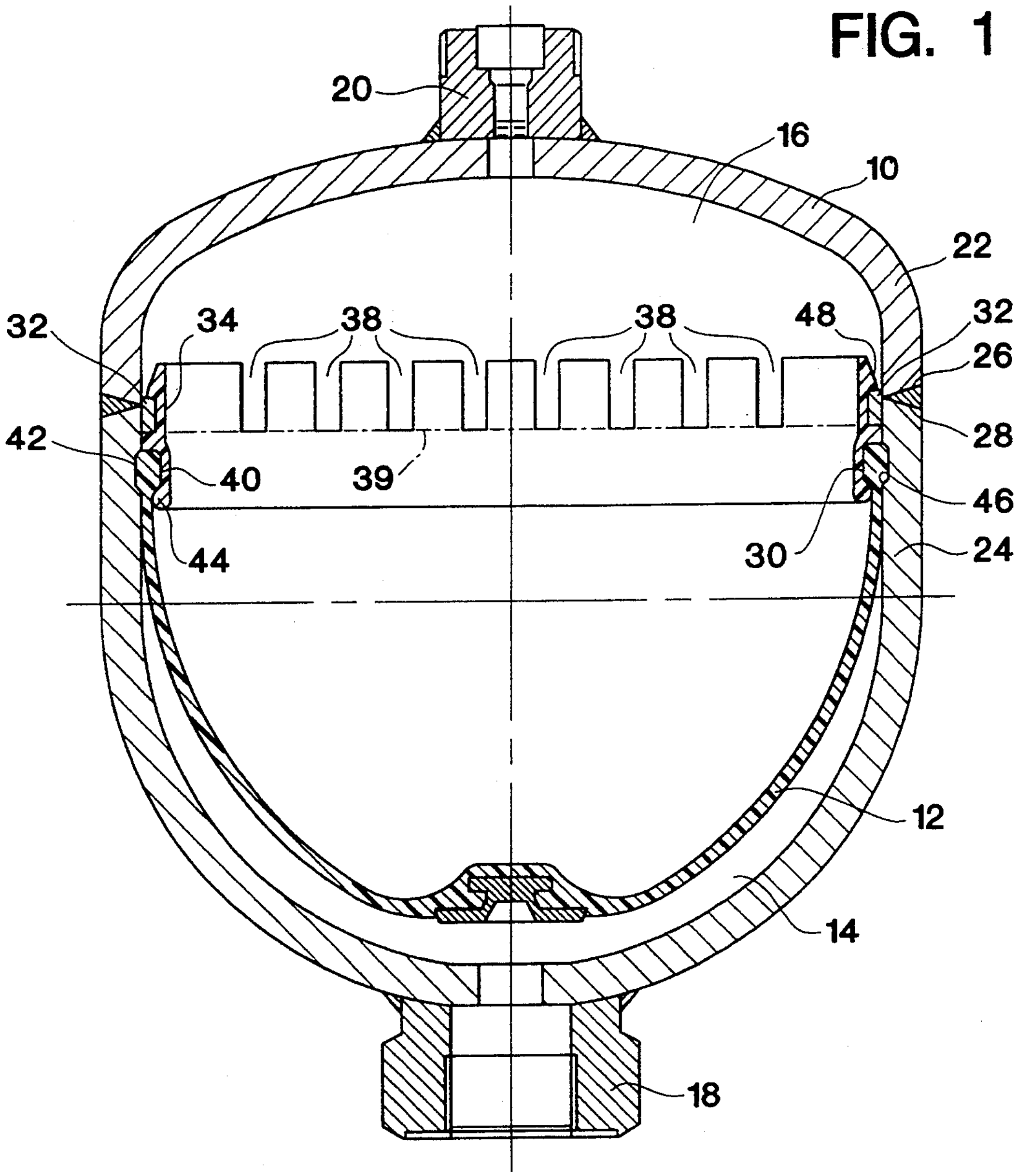
FIG. 1 is a side elevational view in section of a hydraulic accumulator according to the present invention.

The hydraulic accumulator illustrated in FIG. 1 is a so called diaphragm accumulator with a dividing wall 12 in the form of a resilient diaphragm. The dividing wall can be milled and is located in a housing 10.

The dividing wall 12 divides the housing 10 internally into a liquid chamber 14 and into a gas chamber 16. Liquid chamber 14 and gas chamber 16 each comprise a connection 18 and 20, respectively, by means of which the hydraulic accumulator can be connected to pipes of hydraulic system (not shown). Comparable hydraulic accumulators with the features described previously are conventional. In the following, the hydraulic accumulator will be described only in so far as is necessary in order to explain the present invention.

In the direction of view of FIG. 1, the housing 10 comprises an upper housing shell 22 and of a lower housing shell 24. The shells abut against one another along a seam 26. The two shells 22 and 24 can be connected to each other along seam 26 to form the housing 10, by means of an electron beam welding process. The welding seam is designated by the reference numeral 28 in FIG. 1.

The retaining part 30, the dividing wall 12 and the connecting part 32 are located inside the housing 10. The connecting part 32 forms a ring of steel. The height of connecting part 32 is dimensioned so that the seam 26 inside the housing is covered by a projecting portion of connection part 32. The retaining part 30 is likewise constructed in the form of a ring.

On its side facing the connecting part 32, retaining part 30 comprises a groove 34 (see FIG. 2), which is constructed with a substantially rectangular cross-section. In the corners of its groove base, the groove 34 has two recesses 36 of circular cross-section for increasing the elasticity of the individual components of the retaining part 30. The groove 34 is constructed so that the steel ring or connecting part 32 can be received readily therein, with the retaining part 30 being snapped onto the connecting part 32 by way of the groove 34.

On its side facing the gas chamber 16, the retaining part 30 comprises continuous recesses in the form of indentations 38. The indentations are constructed with rectangular cross-sections and are arranged around the retaining part 30 at equal distances from each other. The depth of each indentation 38 is dimensioned such that it is approximately half the height of the annular retaining part 30. The indentations 38 terminate in an imaginary straight line 39. Line 39 connects the respective end of each indentation 38 to the groove 34 at the point forming the transition from the groove base to the groove side wall, and is adjacent to the channel 40.

On its side facing the liquid chamber 14, the retaining part 30 has a channel 40 which faces the inner wall of the housing. The bead-shaped edge 42 of the dividing diaphragm 12 is engaged with channel 40. For supporting this bead-shaped edge 42 and to prevent the dividing diaphragm 12 from sliding out of the channel 40 under load, the retaining part 30 has a thickened portion 44 at its lower end as seen in FIG. 1. On the side opposite the channel 40, but located at the same height, an annular shoulder 46 is provided in and along the inner wall of the housing. Annular shoulder 46 forms an abutment for the dividing wall 12. By means of the shoulder 46 and the thickened portion 44, the edge 42 of the dividing diaphragm 12 is reliably fixed in its marginal position by the annular retaining part 30. The thickened portion 44 comprises rounded transitions, along which the dividing wall 12 may bear during operation, without being damaged.

Figure 2:
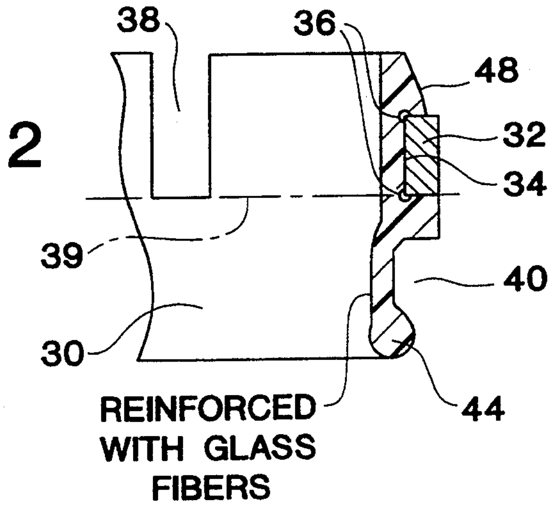
FIG. 2 is a partial, enlarged side elevational view in section of the right-hand portion of the retaining part of FIG. 1.

On its side remote from the dividing wall 12 and facing the housing 10, the retaining part comprises an annular bevel 48 (see FIG. 2). Annular bevel 48 encloses an acute angle with the vertical. This bevel 48 aids assembly when the retaining part 30 is snapped onto or off the connecting part 32. Bevel 48 is on a side of the retaining part remote from dividing wall 12 and on an exposed, radially outwardly directed face directed toward housing 10. The bevel tapers radially inwardly from a location adjacent connecting part 32, such that the bevel tapers radially inwardly relative to and from the connecting part.

The retaining part 30 is formed from synthetic material in the form of a polyarylamide with a glass fiber proportion up to 60 percent. The retaining part can be produced by an injection molding method of the normal or conventional type. However, another glass fiber reinforced synthetic material may also be used, for example, a polyamide with a glass fiber proportion up to 40 to 50 percent.

With the arrangement according to the invention, the synthetic material retaining part 30 reliably presses the dividing wall 12 in a gas-tight manner against the housing 10. Thus, a reliable separation of the liquid chamber 14 from the gas chamber 16 is achieved. The inner wall of the housing 10 has a cylindrical construction in the region of the retaining part 30.

For the manufacture of the hydraulic accumulator according to FIG. 1, the dividing wall 12 together with the retaining part 30 and the connecting part 32 can be inserted loosely in the inside of the housing 10. By means of the shoulder 46 in the housing wall, these parts remain in the position illustrated in FIG. 1, at the time of assembly. After joining the two shells 22 and 24 together and the subsequent electron beam welding along the seam 26, the connecting part 32 is securely welded to the housing 10.

The invention can also be used for other hydraulic accumulators, for example, for a bladder accumulator.

While a particular embodiment has been chosen to illustrate the invention, it will be understood by those skilled in the art that various changes and modifications can be made therein without departing from the scope of the invention as defined in the appended claims.

I claim:

1. A hydraulic accumulator, comprising:

a housing having a liquid chamber and a gas chamber;

a dividing wall in said housing separating said liquid chamber from said gas chamber;

an annular connecting part welded to said housing and formed of metal; and a retaining part coupled to said connecting part and holding said dividing wall in said housing, said retaining part at least partly surrounding said connecting part, being separately formed as a different member from said connecting part, being formed of synthetic material, and pressing parts of said dividing wall against said housing in gas-tight manner.

2. A hydraulic accumulator according to claim 1 wherein said connecting part and said retaining part are rings.

3. A hydraulic accumulator according to claim 1 wherein said synthetic material is reinforced with glass fibers.

4. A hydraulic accumulator according to claim 3 wherein said synthetic material is a polyamide with a glass fiber proportion of at least 40 to 50 percent.

5. A hydraulic accumulator according to claim 3 wherein said synthetic material is a polyarylamide with a glass fiber proportion of at least 60 percent.

6. A hydraulic accumulator according to claim 1 wherein said dividing wall comprises a beaded edge; and said retaining part is annular and comprises indentations, a groove receiving said connecting part, and a channel receiving said beaded edge of said dividing wall.

7. A hydraulic accumulator according to claim 1 wherein said retaining part is annular to define a central axis and comprises a bevel on a side thereof remote from said dividing wall and on an exposed, radially outwardly directed face directed toward said housing, said bevel forming an acute angle with said central axis and tapering from a location adjacent said connecting part radially inwardly.

8. A hydraulic accumulator according to claim 1 wherein said housing comprises an abutment engaging said dividing wall.

9. A hydraulic accumulator according to claim 1 wherein said housing comprises two shells coupled along a seam; and said connecting part covers said seam inside said housing such that said connecting part is connected to said housing simultaneously with connection of said shells.

10. A hydraulic accumulator according to claim 9 wherein said shells are connected by electron beam welding.

11. A hydraulic accumulator according to claim 1 wherein said synthetic material is reinforced with glass fibers.

12. A hydraulic accumulator according to claim 11 wherein said synthetic material is a polyamide with a glass fiber proportion of at least 40 to 50 percent.

13. A hydraulic accumulator according to claim 11 wherein said synthetic material is a polyarylamide with a glass fiber proportion of at least 60 percent.

14. A hydraulic accumulator, comprising:

a housing having a liquid chamber and a gas chamber;

a dividing wall in said housing separating said liquid chamber from said gas chamber, said dividing wall having a beaded edge;

an annular connecting part welded to said housing; and an annular retaining part coupled to said connecting part and holding said dividing wall in said housing, said retaining part at least partly surrounding said connecting part, and being separately formed as a different member from said connecting part, said retaining part including indentations, a groove receiving said connecting part, and a channel receiving said beaded edge of said dividing wall.

15. A hydraulic accumulator according to claim 14 wherein said retaining part comprises a bevel on a side thereof remote from said dividing wall and on a face directed toward said housing.

16. A hydraulic accumulator according to claim 15 wherein said housing comprises an abutment engaging said dividing wall.

17. A hydraulic accumulator according to claim 14 wherein said housing comprises an abutment engaging said dividing wall.

18. A hydraulic accumulator according to claim 14 wherein said retaining part is formed of synthetic material, and presses parts of said dividing wall against said housing in a gas-tight-manner; and said connecting part is formed of steel.

19. A hydraulic accumulator according to claim 18 wherein said housing comprises an abutment engaging said dividing wall.

20. A hydraulic accumulator according to claim 14 wherein said connecting part and said retaining part are formed of different materials.

21. A hydraulic accumulator according to claim 14 wherein said connecting part is formed of metal; and said retaining part is formed of synthetic material.

22. A hydraulic accumulator according to claim 14 wherein said housing comprises two shells coupled along a seam; and said connecting part covers said seam inside said housing such that said connecting part is connected to said housing simultaneously with connection of said shells.

23. A hydraulic accumulator according to claim 22 wherein said shells are connected by electron beam welding.

* * * * *